(12) United States Patent
Chishima et al.

(10) Patent No.: US 8,452,350 B2
(45) Date of Patent: May 28, 2013

(54) PORTABLE COMMUNICATION TERMINAL AND A CONTROL METHOD FOR THE PORTABLE COMMUNICATION TERMINAL

(75) Inventors: Makoto Chishima, Yokohama (JP); Tetsuya Takenaka, Yokohama (JP); Ryuta Fujisawa, Yokohama (JP)

(73) Assignee: Kyocera Corporation, Kyoto (JP)

( * ) Notice: Subject to any disclaimer, the term of this patent is extended or adjusted under 35 U.S.C. 154(b) by 836 days.

(21) Appl. No.: 12/516,767

(22) PCT Filed: Nov. 28, 2007

(86) PCT No.: PCT/JP2007/072955
§ 371 (c)(1), (2), (4) Date: Dec. 10, 2009

(87) PCT Pub. No.: WO2008/066075
PCT Pub. Date: Jun. 5, 2008

(65) Prior Publication Data
US 2010/0130252 A1 May 27, 2010

(30) Foreign Application Priority Data

Nov. 29, 2006 (JP) ................. 2006-322011
Nov. 29, 2006 (JP) ................. 2006-322259
Nov. 29, 2006 (JP) ................. 2006-322297

(51) Int. Cl.
*H04M 1/00* (2006.01)
*H04B 1/38* (2006.01)

(52) U.S. Cl.
USPC ...................... 455/572; 455/552.1

(58) Field of Classification Search
USPC ...................... 455/552.1, 572–574
See application file for complete search history.

(56) References Cited

U.S. PATENT DOCUMENTS 7,379,753 B2 5/2008 Hara et al.
2006/0223465 A1* 10/2006 Akiba et al. ............. 455/127.4

FOREIGN PATENT DOCUMENTS

EP  521609 A2 * 1/1993
JP  10210550 A   8/1998
(Continued)

OTHER PUBLICATIONS

Korean language office action dated Oct. 13, 2011 and its English language translation for corresponding Korean application 1020097013361.

(Continued)

*Primary Examiner* — Vladimir Magloire
(74) *Attorney, Agent, or Firm* — DLA Piper LLP (US)

(57) ABSTRACT

A portable communication terminal comprising of the present invention includes a first wireless communication unit 102 corresponding to a first wireless communication system, an interface 107 to which an external apparatus 200 can be removably connected, a determination unit 111 for determining whether the external apparatus 200 connected to the interface 107 includes a second wireless communication unit 202 corresponding to a second wireless communication system, a battery voltage detection unit 104 for detecting a battery voltage of a power supply unit 103 including a battery, and a control unit 111 for controlling the external apparatus 200 based on whether a communication by the first wireless communication unit 102 is present, a determination result of the determination unit 111, and the battery voltage detected in the battery voltage detection unit 104. Thereby, an influence on the main communication system due to the addition of the sub-communication system is reduced, so that a multi mode communication depending on the battery voltage can be efficiently carried out without any unpredictable situation for a user to occur.

26 Claims, 10 Drawing Sheets

FOREIGN PATENT DOCUMENTS

| | | | |
|---|---|---|---|
| JP | 11252006 | A | 9/1999 |
| JP | 2001308978 | A | 11/2001 |
| JP | 2002125265 | A | 4/2002 |
| JP | 2002208888 | A | 7/2002 |
| JP | 2003087367 | A | 3/2003 |
| JP | 2003298762 | A | 10/2003 |
| JP | 2004235863 | A | 8/2004 |
| JP | 2005303364 | A | 10/2005 |
| JP | 2006025009 | A | 1/2006 |

OTHER PUBLICATIONS

Japanese language office action dated May 24, 2011 and its English language translation for corresponding Japanese application 2006322259.

International search report for corresponding PCT application PCT/JP2007/072955.

Japanese language office action dated Jun. 19, 2012 and its English language translation issued in corresponding Japanese application 2006322011.

Japanese language office action dated Jun. 19, 2012 and its English language translation issued in corresponding Japanese application 2006322297.

Japanese language office action dated Oct. 2, 2012 and its English language translation issued in corresponding Japanese application 2006322297.

Japanese language office action dated Oct. 2, 2012 and its English language translation issued in corresponding Japanese application 2006322011.

* cited by examiner

PORTABLE COMMUNICATION TERMINAL AND A CONTROL METHOD FOR THE PORTABLE COMMUNICATION TERMINAL

CROSS REFERENCE TO RELATED APPLICATION

The present application is a national stage of international application No. PCT/JP2007/072955 filed on Nov. 28, 2007. This application also claims priorities priority to and the benefits of Japanese Patent Applications No. 2006-322011, Japanese Patent Application No. 2006-322259 and Japanese Patent Application No. 2006-322297, all of which were filed on Nov. 29, 2006, the entire contents of which are incorporated herein by reference.

TECHNICAL FIELD

The present invention relates to a portable communication terminal and a control method for the portable communication terminal.

BACKGROUND ART

Conventionally, various wireless communication systems, such as PDC (Personal Digital Cellular), W-CDMA (Wideband Code Division Multiple Access), cdma20001x, PHS (Personal Handy-phone System), wireless LAN (Local Area Network), Bluetooth and the like are operated as a mobile communication system and standardization of hi-speed wireless communication such as WiMAX (Worldwide Interoperability for Microwave Access) is also promoted. Each of the wireless communication systems has a different characteristic.

For example, PHS has an advantage that a large number of terminals usable per area can be provided and usability efficiency of frequency is high, since a cell area is small. Since a PHS terminal has to receive only an individual PCH (Paging Channel), while capturing CS (Cell Station) and its interval is long, it is an advantage that waiting time is long. However, it is a disadvantage that a possibility of an interruption of communication is high, if a communication is made while moving at a high speed, since an area covered by a cell is small.

On the contrary, for example, in W-CDMA, a cell area is large, so that it is possible to use it within a large distance range while moving at a high speed. However, the waiting time is considerably short compared to the PHS terminal, since a W-CDMA terminal performs a reverse-spreading process and the like even in monitoring a call reception or a signal level of a cell and the like.

Further, in wireless LAN represented by broadly used IEEE (Institute of Electrical and Electronic Engineers) 802.11b, a hot spot is placed in a coffee shop or a public facility and the like, and the communication at a maximum of 11 Mbps can be performed. However, a cell area is small and about 10 m in radius, since the wireless LAN is supposed to be used inside.

Recently, a portable communication terminal for multi mode is also considered, in which different wireless communication systems can be used seamlessly. For example, Japanese Patent Application Laid-Open No. 2004-235863 discloses a portable communication terminal in which wireless communication systems are switched over depending on a moving speed of the terminal or by determining a waiting time length in the plurality of wireless communication systems based on a residual battery charge.

DISCLOSURE OF THE INVENTION

Problems to be Solved by the Invention

In a conventionally suggested portable communication terminal for multi mode, a plurality of wireless communication units corresponding to a plurality of wireless communication systems are supposed to be integrated in a terminal. Therefore, power consumption of each wireless communication system and the like can be known in advance.

As a portable communication terminal for multi mode as described above, a structure is also possible, in which a wireless communication unit of a main wireless communication system (also called arbitrarily as a main communication system below) is integrated in the terminal, and a wireless communication unit of a sub-wireless communication system (also called arbitrarily as a sub-communication system below), such as a wireless LAN, Bluetooth and the like is added by inserting an SD card (Secure Digital card) or connecting USB (Universal Serial Bus) via an interface. It is difficult to predict how much electricity consumption increases and how much battery voltage drops by adding the sub-communication system, since it is unknown in the portable communication terminal of such a structure what type of sub-communication system is added. In addition, since each communication system is an independent system, a simultaneous communication is possible.

Therefore, in case that the main communication system is a portable phone, for example, a function as a telephone, such as a call reception and a call transmission, should be able to be used as much as possible. However, if the communication takes place in both systems, while communication in one of the systems is possible, a drop of battery voltage can occur, especially when the battery voltage is low due to the addition of the sub-communication system, and the power supply of the terminal can be switched off, resulting in that the communication is impossible in the both systems.

Also, the power supply can be switched off, if a call transmission is carried out to try to make a telephone call in the main communication system, for example, while browsing in the sub-communication system. In this case, a call may be possible for some time, if the sub-communication system is not activated. Similarly, in responding to a telephone call reception of the main communication system while browsing in the sub-communication system, the power supply can be switched off. The call may be also possible for some time in this case by responding to the call reception, if the sub-communication system is not activated.

The power supply can be also switched off, if the sub-communication system is activated, while the main communication system receives data of Broadcast/Multicast Services (abbreviated arbitrarily as BCMCS below). Since the data of BCMCS has not been received by failure in this case, the data has to be acquired in unicast. The power supply can be also switched off, if the main communication system starts receiving data of BCMCS according to a schedule, for example, while browsing in the sub-communication system. Since the data of BCMCS has not been received by failure in this case, the data has to be acquired in unicast.

Even though the main communication system starts receiving the data of BCMCS according to a schedule, for example, while browsing in the sub-communication system, the power supply can be switched off in the course of the reception of the data of BCMCS. Since the data of BCMCS has either not been received by failure in this case, the data has to be acquired in unicast, and the browsing has to be newly started. In this case, however, the power supply of the terminal may not be switched off, if the communication in the sub-communication system is restrained while receiving the data of BCMCS by the main communication system.

Thus, in a portable communication terminal to which a sub communication system can be added, it is a concern that an unpredictable situation for a user may occur, for example, the communication by the main communication system may be influenced or the power supply of the terminal itself may be switched off by adding the sub-communication system.

Therefore, the object of the invention made in view of the points mentioned above, is to provide a portable communication terminal and a control method for the portable communication terminal, in which the influence to the main communication system by adding the sub-communication system can be reduced, and a multi mode communication depending on the battery voltage can be efficiently performed without any unpredictable situation for a user to occur.

Means to Solve the Problems

To achieve the object above, a portable communication terminal according to the $1^{st}$ aspect of the invention comprises:

a first wireless communication unit corresponding to a first wireless communication system, an interface to which an external apparatus can be removably connected, a determination unit for determining whether the external apparatus connected to the interface includes a second wireless communication unit corresponding to a second wireless communication system, a battery voltage detection unit for detecting a battery voltage of a power supply unit including a battery, and a control unit for controlling the external apparatus based on whether a communication by the first wireless communication unit is present, a determination result of the determination unit, and the battery voltage detected in the battery voltage detection unit.

The invention according to the $2^{nd}$ aspect is characterized in that, in the portable communication terminal according to the $1^{st}$ aspect, the control unit controls the external apparatus such that it is disabled, if the first wireless communication unit is under communication, and the battery voltage detected in the battery voltage detection unit is not more than a predetermined value when it is determined by the determination unit that the external control apparatus includes the second wireless communication unit.

Furthermore, to achieve the object above, a portable communication terminal according to the $3^{rd}$ aspect of the invention comprises:

a first wireless communication unit corresponding to a first wireless communication system, an interface to which a second wireless communication unit corresponding to a second wireless communication system can be removably connected, a battery voltage detection unit for detecting a battery voltage of a power supply unit including a battery, and a control unit for controlling the first wireless communication unit and the second wireless communication unit based on the battery voltage detected in the battery voltage detection unit.

The invention according to the $4^{th}$ aspect is characterized in that, in the portable communication terminal according to the $3^{rd}$ aspect, the control unit provide a control such that the communication by the second wireless communication unit is stopped and the communication by the first wireless communication unit is continued, if the first wireless communication unit and the second wireless communication unit are under communication when the battery voltage detected in the battery voltage detection unit is not more than a first predetermined value.

The invention according to the $5^{th}$ aspect is characterized in that, in the portable communication terminal according to the $4^{th}$ aspect, the control unit provide a control such that a message as to whether to resume the stopped communication by the second wireless communication unit is informed after completion of the communication by the first wireless communication unit.

The invention according to the $6^{th}$ aspect is characterized in that, in the portable communication terminal according to the $3^{rd}$ aspect, the control unit provides a control such that the communication by the second wireless communication unit is stopped and the reception of the data by the first wireless communication unit is continued, if the first wireless communication unit is receiving data of Broadcast/Multicast Service, and the second wireless communication unit is under communication when the battery voltage detected in the battery voltage detection unit is not more than a second predetermined value.

The invention according to the $7^{th}$ aspect is characterized in that, in the portable communication terminal according to the $6^{th}$ aspect, the control unit provides a control such that the stopped communication by the second wireless communication unit is resumed after completion of the reception of the data by the first wireless communication unit.

Furthermore, to achieve the object above, a portable communication terminal according to the $8^{th}$ aspect of the invention comprises:

a first wireless communication unit corresponding to a first wireless communication system, an interface to which a second wireless communication unit corresponding to a second wireless communication system can be removably connected, a battery voltage detection unit for detecting a battery voltage of a power supply unit including a battery, and a control unit for controlling the first wireless communication unit and the second wireless communication unit based on whether a transmission by the first wireless communication unit is present, and the battery voltage detected in the battery voltage detection unit.

The invention according to the $9^{th}$ aspect is characterized in that, in the portable communication terminal according to the $8^{th}$ aspect, the control unit provides a control such that the communication by the second wireless communication unit is stopped and the transmission process by the first wireless communication unit is started, if the second wireless communication unit is under communication and the battery voltage detected in the battery voltage detection unit is not more than a predetermined value when the transmission process by the first wireless communication unit is detected.

Furthermore, to achieve the object above, a portable communication terminal according to the $10^{th}$ aspect of the invention comprises:

a first wireless communication unit corresponding to a first wireless communication system, an interface to which a second wireless communication unit corresponding to a second wireless communication system can be removably connected, a battery voltage detection unit for detecting a battery voltage of a power supply unit including a battery, and a control unit for controlling the first wireless communication unit and the second wireless communication unit based on whether a call reception information is received by the first wireless communication unit and the battery voltage detected in the battery voltage detection unit.

The invention according to the 11$^{th}$ aspect is characterized in that, in the portable communication terminal according to the 10$^{th}$ aspect, the control unit provides a control such that the communication by the second wireless communication unit is stopped and the reception process by the first wireless communication unit is carried out, if the second wireless communication unit is under communication and the battery voltage detected in the battery voltage detection unit is not more than a predetermined value when the first wireless communication unit receives the call reception information.

Furthermore, to achieve the object above, a portable communication terminal according to the 12$^{th}$ aspect of the invention comprises:

a first wireless communication unit corresponding to a first wireless communication system, an interface to which a second wireless communication unit corresponding to a second wireless communication system can be removably connected, a battery voltage detection unit for detecting a battery voltage of a power supply unit including a battery, and a control unit for controlling the second wireless communication unit based on a communication status of the first wireless communication unit, whether an order for a transmission process of the communication by the second wireless communication unit is present, and the battery voltage detected in the battery voltage detection unit.

The invention according to the 13$^{th}$ aspect is characterized in that, in the portable communication terminal according to the 12$^{th}$ aspect, the control unit provide a control such that the transmission process of the communication by the second wireless communication unit is suspended, if the battery voltage detected in the battery voltage detection unit is not more than a predetermined value when an order for a transmission process by the second wireless communication unit is detected while the first wireless communication unit receives data of Broadcast/Multicast service.

The invention according to the 14$^{th}$ aspect is characterized in that, in the portable communication terminal according to the 13$^{th}$ aspect, the control unit provide a control such that the suspended transmission process of the communication by the second wireless communication unit is resumed after completion of the reception of the data by the first wireless communication unit.

The invention according to the 15$^{th}$ aspect is characterized in that, in the portable communication terminal according to the 12$^{th}$ aspect, the control unit provide a control such that the transmission process of the communication by the second wireless communication unit is prohibited, if the battery voltage detected in the battery voltage detection unit is not more than a predetermined value when an order for the transmission process by the second wireless communication unit is detected while the first wireless communication unit receives data of Broadcast/Multicast service.

The invention according to the 16$^{th}$ aspect is characterized in that, in the portable communication terminal according to the 15$^{th}$ aspect, the control unit provide a control such that a message as to whether to start the prohibited communication by the second wireless communication unit is informed after completion of the reception of the data by the first wireless communication unit.

Furthermore, to achieve the object above, a portable communication terminal according to the 17$^{th}$ aspect of the invention comprises:

a first wireless communication unit corresponding to a first wireless communication system, an interface to which a second wireless communication unit corresponding to a second wireless communication system can be removably connected, a battery voltage detection unit for detecting a battery voltage of a power supply unit including a battery, and a control unit for controlling the first wireless communication unit and the second wireless communication unit based on the communication status of the second wireless communication unit and the battery voltage detected in the battery voltage detection unit.

The invention according to the 18$^{th}$ aspect is characterized in that, in the portable communication terminal according to the 17$^{th}$ aspect, the control unit provides a control such that the communication by the second wireless communication unit is stopped and the reception process of the data by the first wireless communication unit is carried out, if the second wireless communication unit is under communication and the battery voltage detected in the battery voltage detection unit is not more than a predetermined value when the first wireless communication unit starts the reception process of the data of the Broadcast/Multicast service.

The invention according to the 19$^{th}$ aspect is characterized in that, in the portable communication terminal according to the 18$^{th}$ aspect, the control unit provides a control such that the stopped communication by the second wireless communication unit is resumed after completion of the reception of the data by the first wireless communication unit.

Furthermore, to achieve the object above, a control method for a portable communication terminal according to the 20$^{th}$ aspect of the invention comprises:

upon controlling the portable communication terminal having a first wireless communication unit corresponding to a first wireless communication system, an interface to which an external apparatus can be removably connected, and a power supply unit including a battery, a determination step for determining whether the external apparatus connected to the interface includes a second wireless communication unit corresponding to a second wireless communication system, a communication status detection step for detecting a communication status of the first wireless communication unit, and a battery voltage detection step for detecting the battery voltage of the power supply unit, wherein the external apparatus is controlled based on a result of the determination in the determination step, a result of the detection in the communication status detection step and the battery voltage detected in the battery voltage detection step.

The invention according to the 21$^{st}$ aspect is characterized in that, in the control method for a portable communication terminal according to the 20$^{th}$ aspect, the external apparatus is controlled such that it is disabled, if it is detected in the communication status detection step that the first wireless communication unit is under communication and the battery voltage detected in the battery voltage detection step is not more than a predetermined value when it is determined in the determination step that the external control apparatus includes the second wireless communication unit.

Furthermore, to achieve the object above, a control method for a portable communication terminal according to the $22^{nd}$ aspect of the invention comprises:

upon controlling the portable communication terminal having a first wireless communication unit corresponding to a first wireless communication system, a second wireless communication unit corresponding to a second wireless communication system removably connected via an interface, and a power supply unit including a battery, a communication status detection step for detecting a communication status of the first wireless communication unit and the second wireless communication unit, and a battery voltage detection step for detecting the battery voltage of the power supply unit, wherein the first wireless communication unit and the second wireless communication unit are controlled based on a result of detection in the communication status detection step and the battery voltage detected in the battery voltage detection step.

The invention according to the $23^{rd}$ aspect is characterized in that, in the control method for a portable communication terminal according to the $22^{nd}$ aspect, a control is provided such that the communication by the second wireless communication unit is stopped and the communication by the first wireless communication unit is continued, if it is detected in the communication status detection step that the first wireless communication unit and the second wireless communication unit are under communication when the battery voltage detected in the battery voltage detection step is not more than a first predetermined value.

The invention according to the $24^{th}$ aspect is characterized in that, in the control method for a portable communication terminal according to the $23^{rd}$ aspect, a control is provided such that a message as to whether to resume the stopped communication by the second wireless communication unit is informed after completion of the communication by the first wireless communication unit.

The invention according to the $25^{th}$ aspect is characterized in that, in the control method for a portable communication terminal according to the $22^{nd}$ aspect, a control is provided such that the communication by the second wireless communication unit is stopped and the reception of the data by the first wireless communication unit is continued, if it is detected in the communication status detection step that the first wireless communication unit is receiving data of Broadcast/Multicast Service, and the second wireless communication unit is under communication when the battery voltage detected in the battery voltage detection step is not more than a second predetermined value.

The invention according to the $26^{th}$ aspect is characterized in that, in the control method for a portable communication terminal according to the $25^{th}$ aspect, a control is provided such that the stopped communication by the second wireless communication unit is resumed after completion of the reception of the data by the first wireless communication unit.

Furthermore, to achieve the object above, a control method for a portable communication terminal according to the $27^{th}$ aspect of the invention comprises:

upon controlling the portable communication terminal having a first wireless communication unit corresponding to a first wireless communication system, a second wireless communication unit corresponding to a second wireless communication system removably connected via an interface, and a power supply unit including a battery, a transmission process detection step for detecting a transmission process by the first wireless communication unit, a communication status detection step for detecting a communication status of the second wireless communication unit, and a battery voltage detection step for detecting the battery voltage of the power supply unit, wherein the first wireless communication unit and the second wireless communication unit are controlled based on a result of detection in the transmission process detection step, a result of detection in the communication status detection step and the battery voltage detected in the battery voltage detection step.

The invention according to the $28^{th}$ aspect is characterized in that, in the control method for a portable communication terminal according to the $27^{th}$ aspect, a control is provided such that the communication by the second wireless communication unit is stopped and the transmission process by the first wireless communication unit is started, if it is detected in the communication status detection step that the second wireless communication unit is under communication and the battery voltage detected in the battery voltage detection unit is not more than a predetermined value when the transmission process by the first wireless communication unit is detected in the transmission process detection step.

Furthermore, to achieve the object above, a control method for a portable communication terminal according to the $29^{th}$ aspect of the invention comprises:

upon controlling the portable communication terminal having a first wireless communication unit corresponding to a first wireless communication system, a second wireless communication unit corresponding to a second wireless communication system removably connected via an interface, and a power supply unit including a battery, a call reception detection step for detecting the reception of a call reception information by the first wireless communication unit, a communication status detection step for detecting the communication status of the second wireless communication unit, and a battery voltage detection step for detecting a battery voltage of the power supply unit, wherein the first wireless communication unit and the second wireless communication unit are controlled based on a result of detection in the call reception detection step, a result of detection in the communication status detection step and the battery voltage detected in the battery voltage detection step.

The invention according to the $30^{th}$ aspect is characterized in that, in the control method for a portable communication terminal according to the $29^{th}$ aspect, a control is provided such that the communication by the second wireless communication unit is stopped and the reception process by the first wireless communication unit is carried out, if it is detected in the communication status detection step that the second wireless communication unit is under communication and the battery voltage detected in the battery voltage detection step is not more than a predetermined value when the reception of the call reception information by the first wireless communication unit is detected.

Furthermore, to achieve the object above, a control method for a portable communication terminal according to the $31^{st}$ aspect of the invention comprises:

upon controlling the portable communication terminal having a first wireless communication unit corresponding to a first wireless communication system, a second wireless communication unit corresponding to a second wireless communication system removably connected via an interface, and a power supply unit including a battery, a communication status detection step for detecting the communication status of the first wireless communication unit, a transmission process order detecting step for detecting an order for the communication transmission process by the second wireless communication unit, and a battery voltage detection step for detecting the battery voltage of the power supply unit, wherein the second wireless communication unit is controlled based on a result of detection in the communication status detection step, a result of detection in the transmission process order detecting step, and the battery voltage detected in the battery voltage detection step.

The invention according to the $32^{nd}$ aspect is characterized in that, in the control method for a portable communication terminal according to the $31^{st}$ aspect, a control is provided such that the transmission process of the communication by the second wireless communication unit is suspended, if the battery voltage detected in the battery voltage detection unit is not more than a predetermined value when it is detected in the communication status detection step that the first wireless communication unit is receiving data of Broadcast/Multicast service and the order for the transmission process by the second wireless communication unit is detected in the transmission process order detecting step.

The invention according to the $33^{rd}$ aspect is characterized in that, in the control method for a portable communication terminal according to the $32^{nd}$ aspect, a control is provided such that the suspended transmission process of the communication by the second wireless communication unit is resumed after completion of the reception of the data by the first wireless communication unit.

The invention according to the $34^{th}$ aspect is characterized in that, in the control method for a portable communication terminal according to the $31^{st}$ aspect, a control is provided such that the transmission process of the communication by the second wireless communication unit is prohibited, if the battery voltage detected in the battery voltage detection step is not more than a predetermined value when it is detected in the communication status detection step that the first wireless communication unit is receiving the data of the Broadcast/Multicast service and an order for the transmission process by the second wireless communication unit is detected in the transmission process order detecting step.

The invention according to the $35^{th}$ aspect is characterized in that, in the control method for a portable communication terminal according to the $34^{th}$ aspect, a control is provided such that a message as to whether to start the transmission process of the prohibited communication by the second wireless communication unit is informed after the completion of the reception of the data by the first wireless communication unit.

Furthermore, to achieve the object above, a control method for a portable communication terminal according to the $36^{th}$ aspect of the invention comprises:

upon controlling the portable communication terminal having a first wireless communication unit corresponding to a first wireless communication system, a second wireless communication unit corresponding to a second wireless communication system removably connected via an interface, and a power supply unit including a battery, a data reception start detecting step for detecting the start of a data reception process of data of Broadcast/Multicast service by the first wireless communication unit, a communication status detection step for detecting a communication status of the second wireless communication unit, and a battery voltage detection step for detecting a battery voltage of the power supply unit, wherein the first wireless communication unit and the second wireless communication unit are controlled based on a result of detection in the data reception start detecting step, a result of detection in the communication status detection step and the battery voltage detected in the battery voltage detection step.

The invention according to the $37^{th}$ aspect is characterized in that, in the control method for a portable communication terminal according to the $36^{th}$ aspect, a control is provided such that the communication by the second wireless communication unit is stopped and the reception process of the data by the first wireless communication unit is carried out, if it is detected in the communication status detection step that the second wireless communication unit is under communication and the battery voltage detected in the battery voltage detection step is not more than a predetermined value when the start of the reception process of the data by the first wireless communication unit is detected in the data reception start detecting step The invention according to the $38^{th}$ aspect is characterized in that, in the control method for a portable communication terminal according to the $37^{th}$ aspect, a control is provided such that the stopped communication by the second wireless communication unit is resumed after completion of the reception of the data by the first wireless communication unit.

Effect of the Invention

According to the present invention, an influence on the first wireless communication unit (the main communication system) due to the addition of the second wireless communication unit (the sub-communication system) is reduced, so that a multi mode communication depending on the battery voltage is efficiently carried out without any unpredictable situation for a user to occur. Especially, If the external apparatus with the second wireless communication unit is connected via an interface when the first communication unit is under communication and the battery voltage is not more than a predetermined value, it is avoided, by rendering the external apparatus to be disabled, that the power supply of the terminal is switched off, so that the communication by the first wireless communication unit is continued. Thus, if the first wireless communication unit is on the phone, it is prevented that the communication is unexpectedly interrupted by the connection of the second wireless communication unit.

Further, if the battery voltage decreases during the simultaneous communication of the first wireless communication unit and the second wireless communication unit, a priority is given to the communication by the first wireless communication unit, so that it can be prevented that the both communications end simultaneously in an extraordinary way.

Moreover, if the battery voltage decreases when the communication of the first wireless communication unit is started during the communication of the second wireless communication unit, a priority is given to the communication by the first wireless communication unit, so that it can be prevented that the both communications end simultaneously in an extraordinary way.

DESCRIPTION OF EMBODIMENTS

Figure 1:
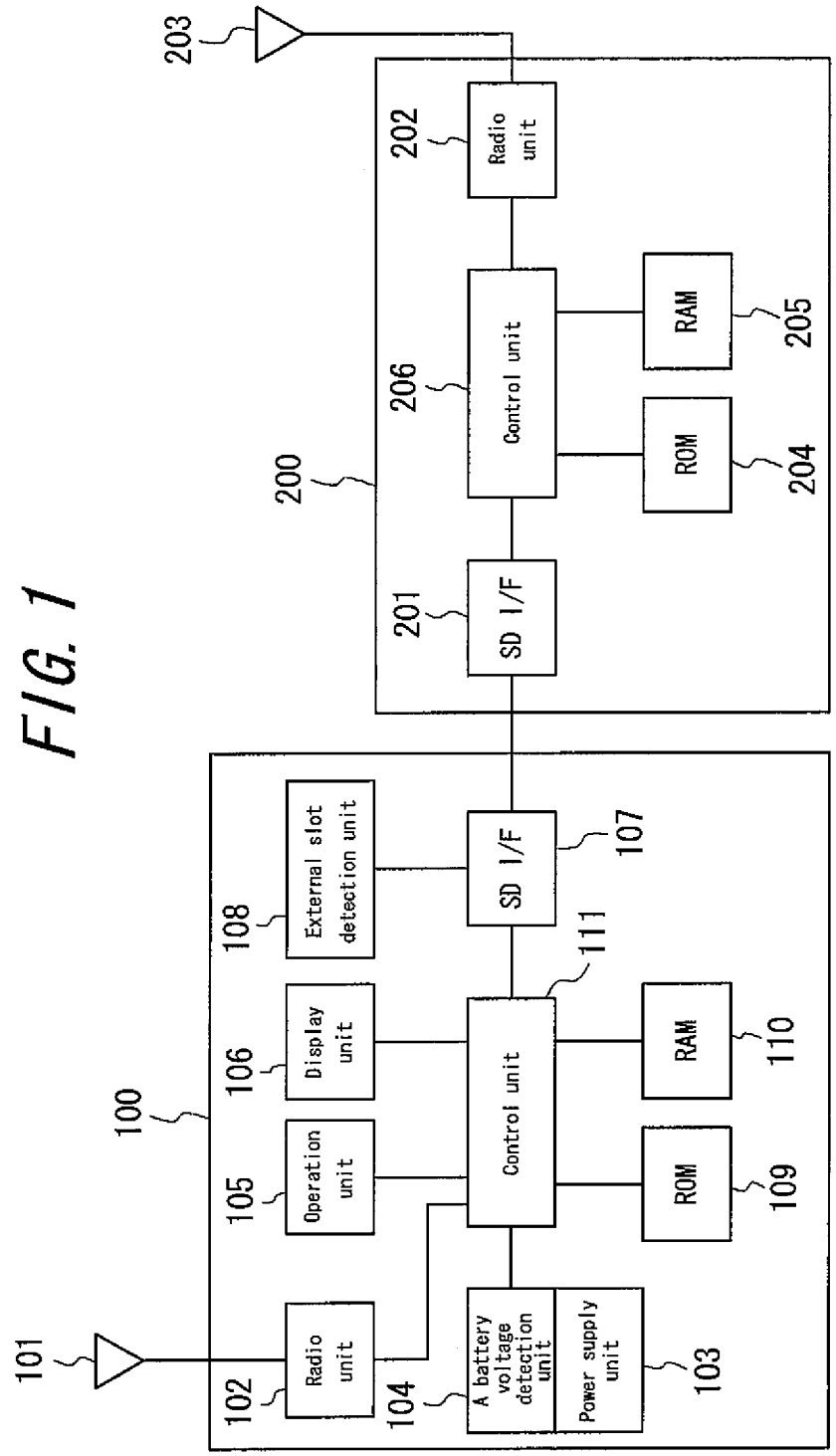
FIG. 1 is a block diagram showing a configuration of a main part of a portable communication terminal according to an embodiment of the present invention.

DESCRIPTION OF REFERENCE SYMBOLS 100 portable communication terminal
101 antenna
102 radio unit
103 power supply unit
104 battery voltage detection unit
105 operation unit
106 display unit
107 SDI/F
108 external slot detection unit
109 ROM
110 RAM
111 control unit
200 SD wireless card
201 SDI/F
202 radio unit
203 antenna
204 ROM
205 RAM
206 control unit

BEST MODE FOR CARRYING OUT THE INVENTION

Preferred embodiments of the present invention will now be described with reference to the accompanying drawings.

FIG. 1 is a block diagram showing a configuration of a main part of a portable communication terminal according to an embodiment of the present invention. A mobile communication terminal 100 is a mobile phone terminal comprising an antenna 101, a radio unit 102, a power supply unit 103 including a battery, a battery voltage detection unit 104 for measuring a battery voltage of the power supply unit 103, an operation unit 105 such as an input key or a touch panel, a display unit 106 such as LCD or OEL, SDI/F 107 for inserting a corresponding SDI/F card, an external slot detection unit 108 for detecting an insertion of a card corresponding to SDI/F into the SDI/F 107, ROM 109 and RAM 110 for writing software and the like, and a control unit 111 for controlling the whole operation.

The radio unit 102 constitutes a first wireless communication unit (arbitrarily called as a main communication unit below) corresponding to a first wireless communication system (a main communication system) such as cdma20001x or PDC which are wireless communication systems provided by a communications company, and includes a transmission unit and a reception unit and the like, so that a transmission and a reception of an electric wave via antenna 101 is possible. Here, for convenience of explanation, it is defined that the main communication system performs a cdma20001x communication (arbitrarily called as a 1x communication below) with transmission and reception and a reception of data of BCMCS (Broadcast/Multicast Services) without transmission by cdma20001xEV-DO.

An SD wireless card 200 can be also removably inserted into SDI/F 107 as a card corresponding to the SDI/F. The SD wireless card 200 constitutes a second wireless communication unit (arbitrarily called as a sub-communication unit below) corresponding to a second wireless communication system (a sub-communication system), and has an SDI/F 201, a radio unit 202 and an antenna 203 for performing communication by the sub-communication system, ROM 204 and RAM 205 for writing software and the like of the sub-communication system, and a control unit 206 for controlling the whole operation.

The SD wireless card 200 is connected with the portable communication terminal 100 by being inserted into SDI/F 107 of the portable communication terminal 100 and provided with power supply from the power supply unit 103, so that the communication by the sub-communication system can be performed independently of the mobile communication terminal 100. Here, for convenience of explanation, it is defined that the SD wireless card 200 performs the wireless LAN communication.

Figure 2:
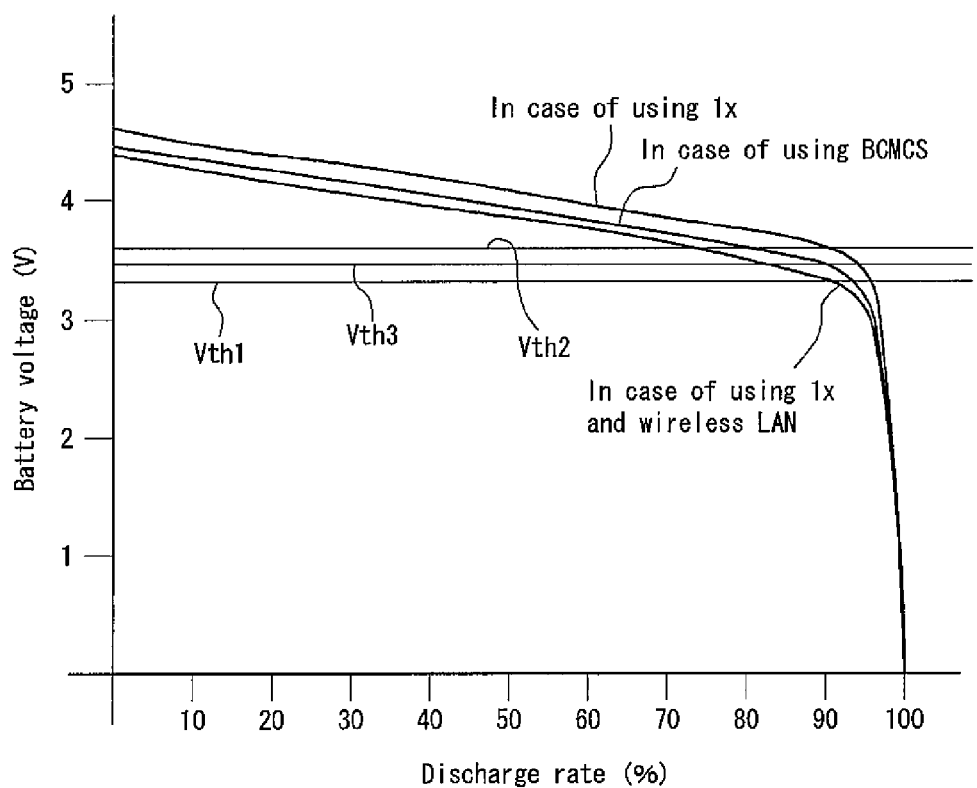
FIG. 2 is a diagram showing an example of discharge rate-voltage characteristic of a battery constituting a power supply unit shown in FIG. 1.

FIG. 2 is a diagram showing an example of discharge rate-voltage characteristic of a battery constituting the power supply unit 103 shown in FIG. 1. Here, a case in which only the 1x communication is carried out in the main communication unit (in the case of using 1x), a case in which only the data reception of the BSMCS is carried out in the main communication unit (in the case of using BCMCS), and a case in which the 1x communication is carried out in the main communication unit and the wireless LAN communication is carried out in the sub-communication unit simultaneously (in the case of using 1x and wireless LAN).

As apparent from FIG. 2, generally in a battery, the voltage decreases, as the discharge rate increases, and the voltage drop increases, as the electric current increases. Usually, a lithium-ion battery of rating 3.7 V is used in a mobile phone terminal, and in the case of the mobile phone terminal of cdma20001x system, it is designed such that the communication is disabled, for example, if the battery voltage is around 3.4 V, and then the power supply of the terminal itself is automatically switched off when the battery voltage is not higher than 3.3 V. In order to indicate a residual battery charge to a user, in the terminal of cdma20001x system, the residual battery charge is estimated from the battery voltage and indicated on the display unit with 1 to 3 lamps, or an indication of "Low Battery" is provided, if the battery voltage is not more than 3.4 V.

In this embodiment, in order to allow the simultaneous communication by the main communication unit and the sub-communication unit to be carried out, for example, a lithium-ion battery with rating 4.6 V is used as a battery accommodated in the power supply unit 103, and a first threshold value (Vth1), a second threshold value (Vth2) and a third threshold value (Vth3) are provided for the battery voltage to control the operation based on a comparison of the battery voltage detected in the battery voltage detection unit 104 with the threshold values.

Vth1 is the lowest voltage with which the main communication unit can maintain the 1x communication. Vth2 is a voltage that may reach Vth1 under the influence of voltage drop of both the main communication unit and the sub-communication unit, if the 1x communication by the main communication unit and the communication by the sub-communication unit are carried out simultaneously. Vth3 is the lowest voltage with which the sub-communication unit can carry out the communication, while the main communication unit receives the data of BCMCS. In this embodiment these threshold values are defined as Vth1<Vth3<Vth2 and stored in ROM 109 or RAM 110 in advance.

The battery voltage of the power supply unit 103 can be detected by the battery voltage detection unit 104 continuously and compared with a required threshold value in the control unit 111, or the battery voltage can be detected periodically and the detected battery voltage can be stored in RAM 110 while updating, so that the newest battery voltage stored in the RAM 110 and the required threshold value can be compared in the control unit 111.

An example of operation of the wireless communication terminal 100 according to the embodiment will be explained with reference to the flow diagrams shown in FIG. 3 to FIG. 10.

Figure 3:
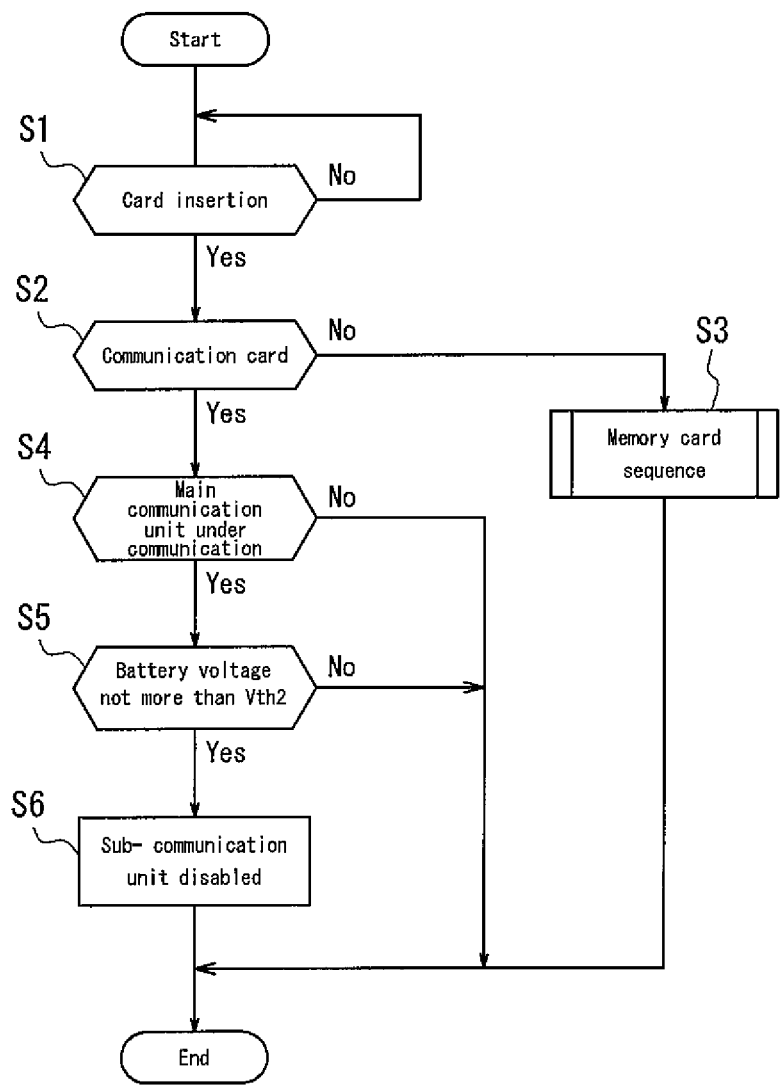
FIG. 3 is a flow diagram showing an example of the operation of the portable communication terminal shown in FIG. 1 including detection of an insertion of a card into SDI/F.

FIG. 3 is a flow diagram showing an example of operation including the detection of insertion of a card into the SDI/F 107. To begin with, the external slot detection unit 108 monitors whether the card is inserted into the SDI/F 107 (step S1), and if the insertion is detected, it is determined in the control unit 111 whether the card is a communication card having a wireless function (step S2). Thus, the control unit 111 also constitutes a determination unit for determining whether the external apparatus connected with the SDI/F 107 includes the sub-communication unit corresponding to the sub-communication system.

As a result, if the card is not a communication card, but it is, for example, a memory card, a sequence adapted to the memory card is operated (step S3). If the card is an SD wireless card 200, the communication status as to whether the main communication unit is under 1x communication is checked in the control unit 111 (step S4).

If the main communication unit is not under 1x communication, the sub-communication unit is enabled, and if the main communication unit is under 1x communication, then it is determined in the control unit 111 whether the battery voltage measured in the battery voltage detection unit 104 is not more than Vth2 (a predetermined value) (step S5). As a result, if the battery voltage is not more than Vth2, the sub-communication unit is disabled (step S6), and the status is indicated on the display unit 106.

Thereby, if the sub-communication unit is added during the call by the main communication unit, the sub-communication unit is disabled at the time when the battery voltage becomes not more than Vth2 and the call by the main communication unit is continued, so that a sudden interruption of the call due to the addition of the sub-communication unit can be prevented and an unpredictable situation for a user is not caused any more.

Figure 4:
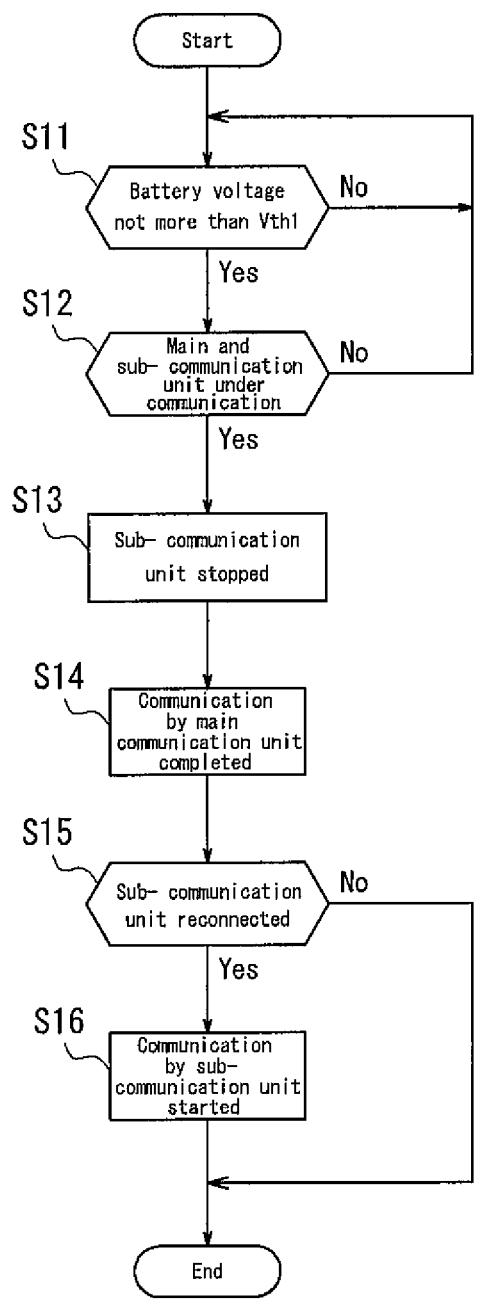
FIG. 4 is a flow diagram showing an example of operation of the portable communication terminal shown in FIG. 1 when the 1x communication by a main communication unit and the wireless LAN communication by the sub-communication unit are carried out simultaneously.

FIG. 4 is a flow diagram showing an example of the operation when the 1x communication by the main communication unit and the wireless LAN communication by the sub-communication unit are carried out simultaneously. To begin with, the control unit 111 monitors whether the battery voltage measured in the battery voltage detection unit 104 is not more than Vth1 (a first predetermined value) (step S11), and if it is not more than Vth1, the control unit 111 checks the communication status as to whether the main communication unit and the sub-communication unit are under communication or not (step S12). If the main communication unit and the sub-communication unit are under communication, it is indicated on the display unit 106 that the sub-communication unit has to be stopped and the communication by the sub-communication unit is stopped (step S 13).

Thereafter, when the 1x communication by the main communication unit is completed (step S14), the sub-communication unit is automatically reconnected to resume the communication, or a user is allowed to select whether to reconnect the sub-communication unit. FIG. 4 shows the case in which a user is allowed to select whether to reconnect the sub-communication unit. In this case, if the 1x communication is completed, there is indicated, on the display unit 106, a message that encourages the user to select whether to reconnect the sub-communication unit (step S15). As a result, if the user selects the reconnection via the operation unit 105, the sub-communication unit is reconnected to start the wireless LAN communication, which is indicated on the display unit 106 accordingly (step 16).

Thereby, it will not happen that the power supply unit 103 is switched off due to the decrease of the battery voltage and the both communications are ended simultaneously in an unordinary way, while the 1x communication by the main communication unit and the wireless LAN communication by the sub-communication unit are performed simultaneously, so that the 1x communication by the main communication unit can be continued at the time when the battery voltage decreases to Vth1 or less than Vth1, and the function as a telephone can be used as much as possible.

Figure 5:
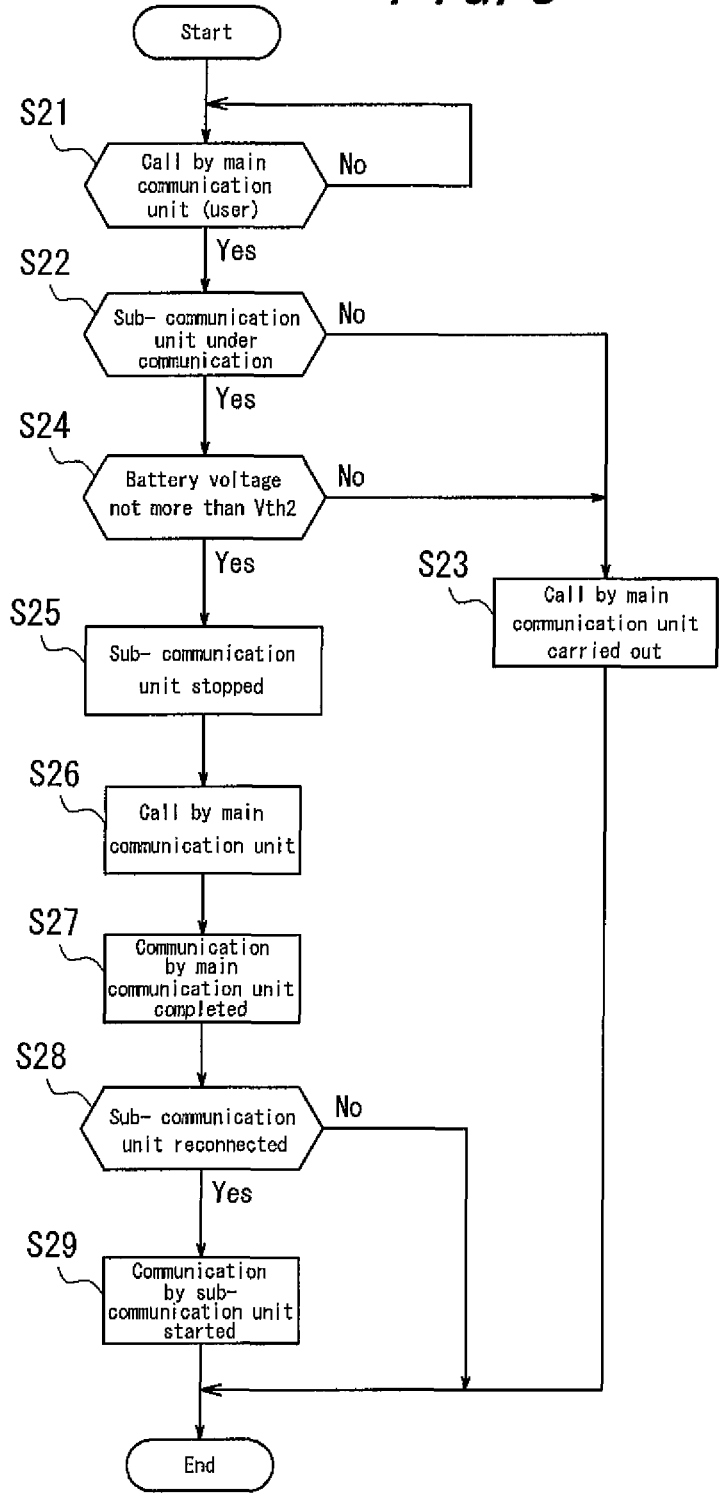
FIG. 5 is a flow diagram showing an example of operation of the portable communication terminal shown in FIG. 1 when the main communication unit carries out a call by the 1x communication during the wireless LAN communication in the sub-communication unit.

FIG. 5 is a flow diagram showing an example of operation when the main communication unit performs a call transmission (a transmission process) by the 1x communication during the wireless LAN communication by the sub-communication unit. If a call transmission via the operation unit 105 by a user is detected (step S21), the control unit 111 checks the communication status as to whether the sub-communication unit is under communication or not (step S22). If the sub-communication unit is not under communication, the call transmission by the main communication unit is carried out to start the 1x communication by the main communication unit (step S23).

If it is determined in step S22 that the sub-communication unit is under communication, it is checked whether the battery voltage measured in the battery voltage detection unit 104 is not more than Vth2 (a predetermined value) (step S24), and if the battery voltage is over Vth2, the call transmission by the main communication unit is carried out by moving to step S23. In this case, therefore, the 1x communication by the main communication unit is started simultaneously with the wireless LAN communication by the sub-communication unit.

On the other hand, if the battery voltage is not more than Vth2 in step 24, it is indicated on the display unit 106 that the sub-communication unit has to be stopped, and the wireless LAN communication by the sub-communication unit is stopped (step S25), and the call transmission by the main communication unit is carried out to start the 1x communication (step S26).

Thereafter, when the 1x communication by the main communication unit is completed (step S27), the sub-communication unit is automatically reconnected to resume the communication, or a user is allowed to select whether to reconnect the sub-communication unit. FIG. 5 is a flow diagram showing the case in which a user is allowed to select whether to reconnect the sub-communication unit. Similarly to the case in FIG. 4, if the 1x communication is completed, the control unit 111 indicates a message, on the display unit 106, that encourages the user to select whether to reconnect the sub-communication unit (step S28). If the user selects the reconnection via the operation unit 105, the sub-communication unit is reconnected to start the wireless LAN communication, which is indicated on the display unit 106 accordingly (step S29).

Thereby, when the main communication unit carries out a call transmission, for example, during browsing in the sub-communication unit, the power supply unit 103 is not switched off, even if the battery voltage decreases to Vth2 or less than Vth2, so that the call transmission process is carried out and the call is enabled.

Figure 6:
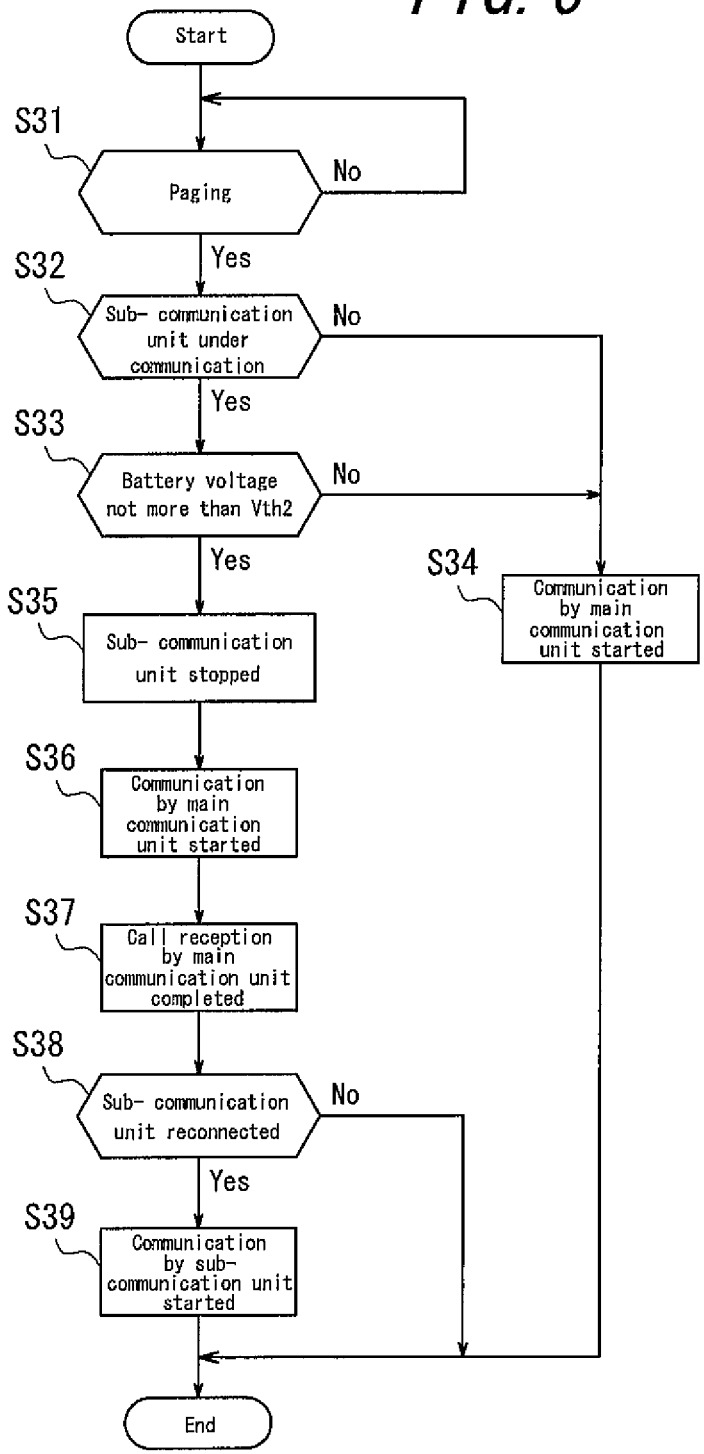
FIG. 6 is a flow diagram showing an example of operation of the portable communication terminal shown in FIG. 1 when the main communication unit processes a call reception by the 1x communication during the wireless LAN communication in the sub-communication unit.

FIG. 6 is a flow diagram showing an example of operation when the main communication unit processes a call reception by the 1x communication during the wireless LAN communication by the sub-communication unit. To begin with, if it is detected that the main communication unit has received a paging message (a call reception information) (step S31), the control unit 111 checks the communication status as to whether the sub-communication unit is under communication or not (step S32), and if the sub-communication unit is under communication, then it is determined whether the battery voltage measured in the battery voltage detection unit 104 is not more than Vth2 (a predetermined value) (step S33).

As a result, if the battery voltage is over Vth2, the call reception information received by the main communication unit is indicated on the display unit 106, and it is also indicated that the communication by the sub-communication unit is continued, and the 1x communication by the main communication is started simultaneously with the wireless LAN communication by the sub-communication unit by carrying out a call reception sequence (step S34). If the sub-communication unit is not under communication in step S32, a call reception sequence is carried out to start the 1x communication by moving to step 34 without checking the battery voltage.

On the contrary, if the battery voltage is not more than Vth2 in step 33, the call reception information received in the main communication unit is indicated on the display unit 106 and it is also indicated that the sub-communication unit has to be stopped, and the communication by the sub-communication unit is stopped (step S35), and a call reception sequence is carried out to start the 1x communication by the main communication unit (step S36).

Thereafter, when the 1x communication by the main communication unit is completed (step S37), the sub-communication unit is automatically reconnected to resume the communication, or a user is allowed to select whether to reconnect the sub-communication unit. FIG. 6 is a flow diagram showing the case in which a user can select whether to reconnect the sub-communication unit. Similarly to the case in FIG. 5, the control unit 111 indicates a message, on the display unit 106, that encourages the user to select whether to reconnect the sub-communication unit (step S38), and if the user selects the reconnection via the operation unit 105, the sub-communication unit is reconnected to start the wireless LAN communication, which is indicated on the display unit 106 accordingly (step. S39).

Thereby, the power supply unit 103 is not switched off in response to the reception of the call reception information by the main communication unit, for example, during browsing in the sub-communication unit, even if the battery voltage decreases to Vth2 or less than Vth2, so that the call reception process is carried out and the communication is enabled.

Figure 7:
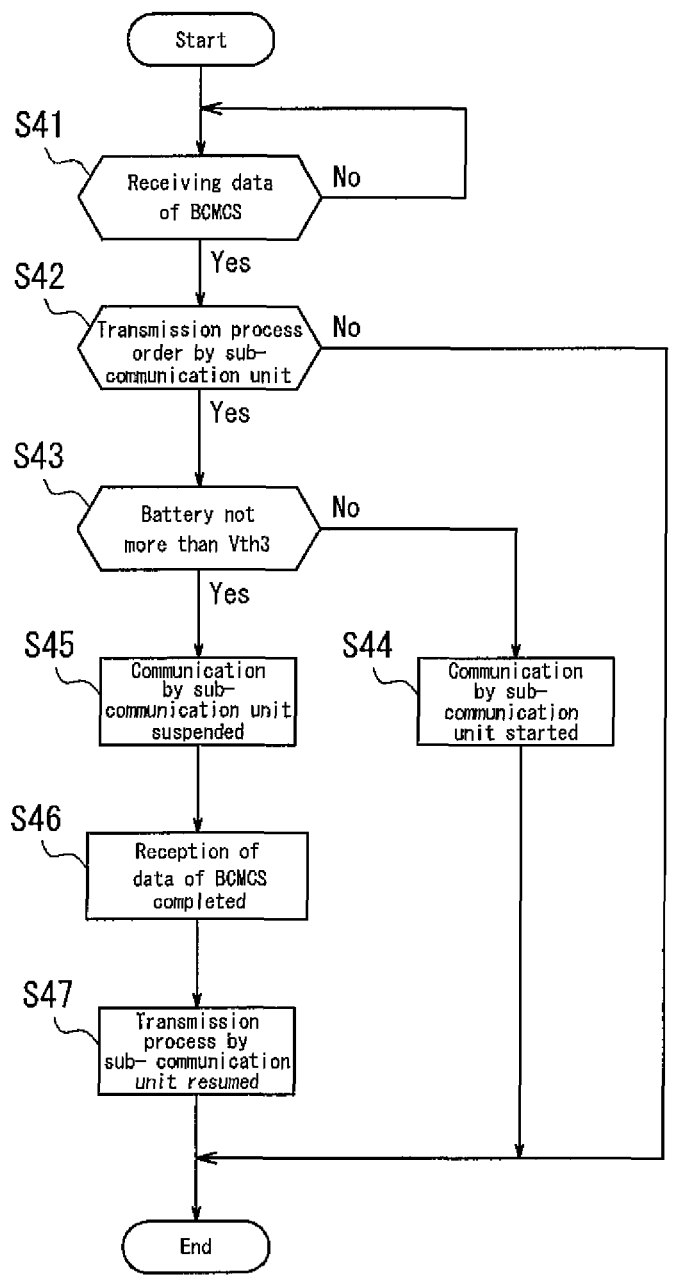
FIG. 7 is a flow diagram showing an example of operation of the portable communication terminal shown in FIG. 1, when an order for the transmission process in the wireless LAN communication is provided from the sub-communication unit during the reception of the data of BCMCS without the transmission by the main communication unit.

FIG. 7 is a flow diagram showing an example of operation when an order for the transmission process in the wireless LAN communication is provided from the sub-communication unit during the reception of the data of BCMCS without the transmission by the main communication unit. To begin with, if it is detected in the control unit 111 that the communication status of the main communication unit shows the reception of the data of BCMCS (step S41), the control unit 111 checks whether an order for the transmission process is provided from the sub-communication (step S42).

If it is detected that the order for the transmission process is provided from the sub-communication unit, the control unit 111 checks whether the battery voltage measured in the battery voltage detection unit 104 is not more than Vth3 (a predetermined value) (step S43), and if the battery voltage is over Vth3, the transmission process from the sub-communication unit is carried out to start the wireless LAN communication by the sub-communication unit (in step S44). Thus, in this case, the data reception of the BCMCS by the main communication unit and the wireless LAN communication by the sub-communication unit are carried out simultaneously.

On the contrary, if the battery voltage is not more than Vth3 in step S43, it is indicated on the display unit 106 that the transmission process from the sub-communication unit has to be suspended and the wireless LAN communication by the sub-communication unit is suspended (step S45). The suspended status does not have to be indicated on the display unit 106, but may be presented as the process in progress.

Thereafter, when the reception of the data of BSMCS by the main communication unit is completed (step S46), the control unit 111 carries out the suspended transmission process from the sub-communication unit to resume the wireless LAN communication. (step S47).

Thereby, if the sub-communication unit is activated while the main communication unit receives the data of BCMCS according to a schedule, the power supply unit 103 is not switched off and the data of BCMCS can be received, even if the battery voltage decreases to Vth3 or less than Vth3. Thus, it is not necessary to acquire the data later in unicast due to the failed reception of the data of BCMCS, so that a user's trouble can be saved and the battery consumption can be further restrained, which contributes to an extension of the waiting time. In addition, in this example of operation, the transmission process from the suspended sub-communication unit is carried out automatically after completing the reception of the data of BCMCS, so that it is not necessary for a user to carry out the transmission operation of the sub-communication unit by operating the operation unit 105 again and usability can be improved.

Figure 8:
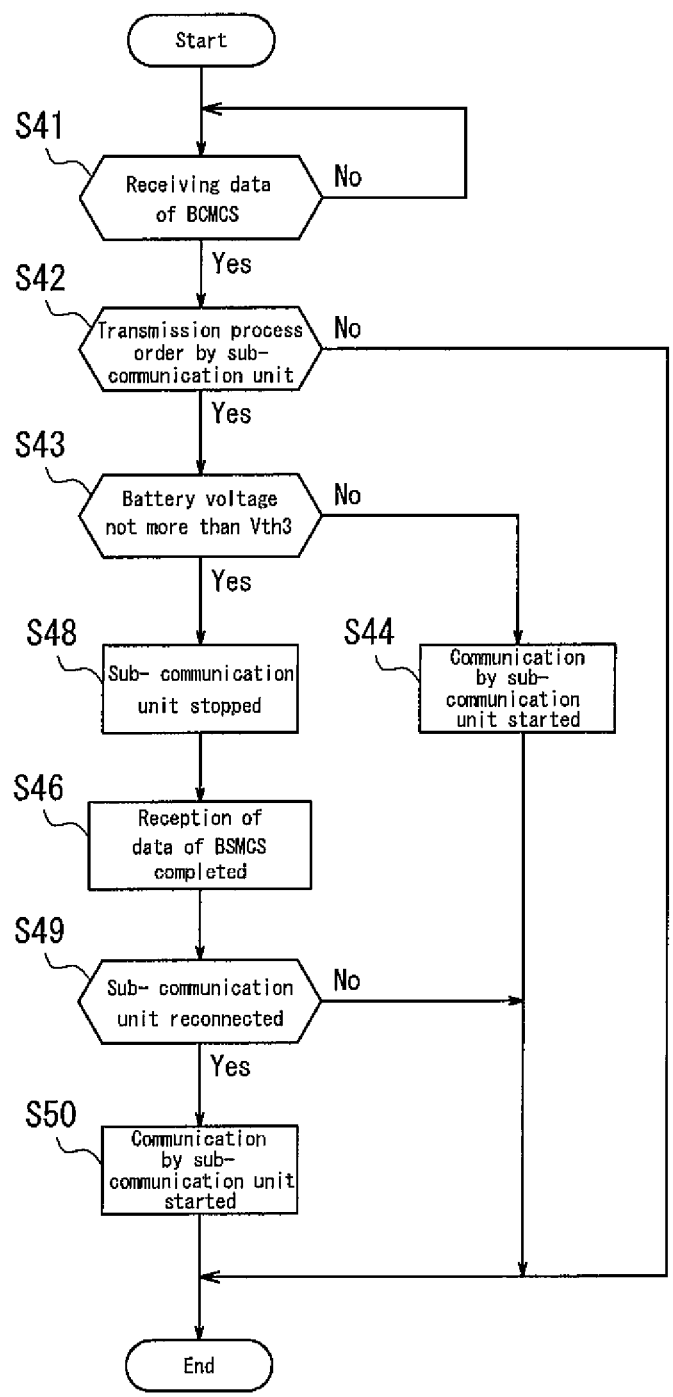
FIG. 8 is a flow diagram showing another example of operation of the portable communication terminal shown in FIG. 1 when an order for the transmission process in the wireless LAN communication is provided from the sub-communication unit during the reception of the data of BCMCS without the transmission by the main communication unit.

FIG. 8 is a flow diagram showing another example of operation when an order for a transmission process in the wireless LAN communication is provided from the sub-communication unit during the reception of the data of BCMCS without the transmission by the main communication unit. In this example of operation, if the control unit 111 detects that the communication status of the main communication unit shows that the main communication unit is receiving the data of BCMCS (step S41) and that an order for the transmission process is provided from the sub-communication unit (step S42) when the battery voltage measured in the battery voltage detection unit 104 is not more than Vth3 (a predetermined value), it is indicated on the display unit 106 that the transmission process from the sub-communication unit has to be inhibited and the wireless LAN communication by the sub-communication unit is stopped (step S45).

Thereafter, when the reception of the data of BCMCS by the main communication unit is completed (step S46), the control unit 111 indicates a message, on the display unit 106, that encourages a user to select whether to reconnect the sub-communication unit (step S49). As a result, if the user selects the reconnection via the operation unit 105, the sub-communication unit is reconnected to resume the wireless LAN communication, which is indicated on the display unit 106 accordingly (step S50). Other operations are provided similarly to the case in FIG. 7.

Thereby, if the sub-communication unit is activated during the reception of the data of BCMCS, the data of BCMCS can be received, even if the battery voltage decreases to Vth3 or less than Vth3. Thus, it is not necessary to acquire data later in unicast due to the failed reception of data of BCMCS, so that a user's trouble can be saved and the battery consumption can be further restrained, which contributes to an extension of the waiting time. In addition, in this example of operation, the user can select whether to reconnect the sub communication unit after completion of the reception of the data of BCMCS, so that the communication is not started when the communication by the sub-communication unit is not necessary anymore and the battery consumption can be effectively restrained, which contributes to an extension of the waiting time. If it is needed to take a long time (that a user cannot wait for, for example, about 30 minutes) until the reception of the data of BCMCS is completed, the selection process of the reconnection can be skipped.

Figure 9:
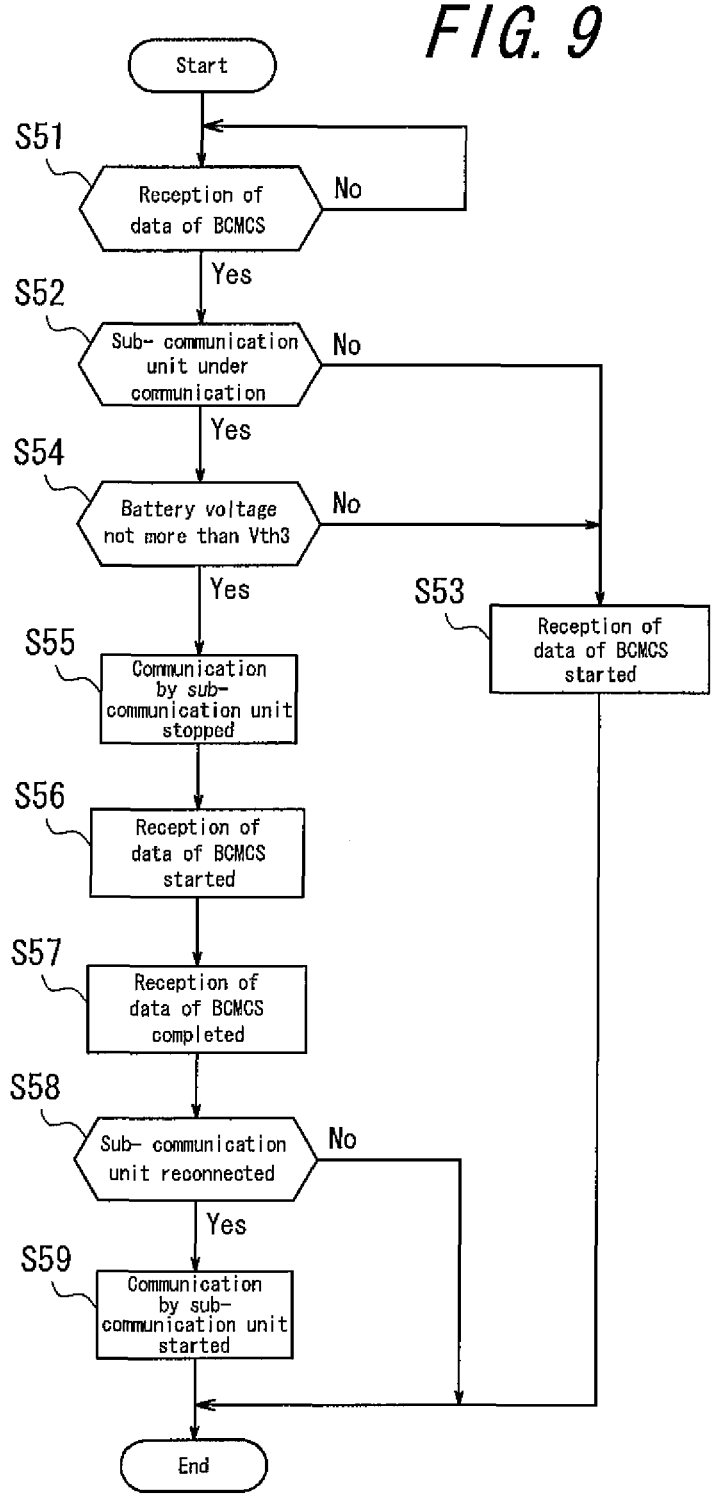
FIG. 9 is a flow diagram showing an example of operation of the portable communication terminal shown in FIG. 1 when the main communication unit performs the reception of the data of BCMCS during the wireless LAN communication in the sub-communication unit.

FIG. 9 is a flow diagram showing an example of operation when the main communication unit performs the reception of the data of BCMCS during the wireless LAN communication in the sub-communication unit. Here, after detecting a reception of an electric wave of BCMCS by the main communication unit, the control unit 111 firstly checks the communication status as to whether the sub-communication unit is under communication (step S52). If the sub-communication unit is not under communication, then the control unit 111 starts receiving the data of BCMCS, and determines whether the battery voltage measured in the battery voltage detection unit 104 is not more than Vth3 (a predetermined value) (step S54).

As a result, if the battery voltage is over Vth3, the reception of the data of BCMCS by the main communication unit is started, simultaneously with the wireless LAN communication by the sub-communication unit (step S53).

On the contrary, if the battery voltage is not more than Vth3, it is indicated on the display unit 106 that the reception of the data of BCMCS is to be carried out and the sub-communication unit has to be stopped, and the reception of the data of BCMCS by the main communication unit is started after the wireless LAN communication by the sub-communication unit is stopped (step S55) (step S56).

Thereafter, when the reception of the data of BCMCS in the main communication unit is completed (step S57), the sub-communication unit is automatically reconnected to resume the communication, or a user can select whether to reconnect the sub-communication unit. FIG. 9 is a flow diagram showing the case in which a user can select whether to reconnect the sub-communication unit. In this case, after completing the reception of the data of BCMCS, the control unit 111 indicates a message, on the display unit 106, that encourages a user to select whether to reconnect the sub-communication unit (step S58). As a result, if the user selects the reconnection via the operation unit 105, the sub-communication unit is reconnected to start the wireless LAN communication, which is indicated on the display unit 106 accordingly (step S59). If the time required to complete the reception of the data of BCMCS is too long for a user to wait, for example, about 30 minutes, the selection process of the reconnection can be skipped.

Thereby, for example, if the main communication unit starts receiving the data of BCMCS according to a schedule during browsing in the sub-communication unit, the data of BCMCS can be received, even if the battery voltage decreases to Vth3 or less than Vth3. Thus, the same effect as in FIG. 7 and FIG. 8 can be obtained.

Figure 10:
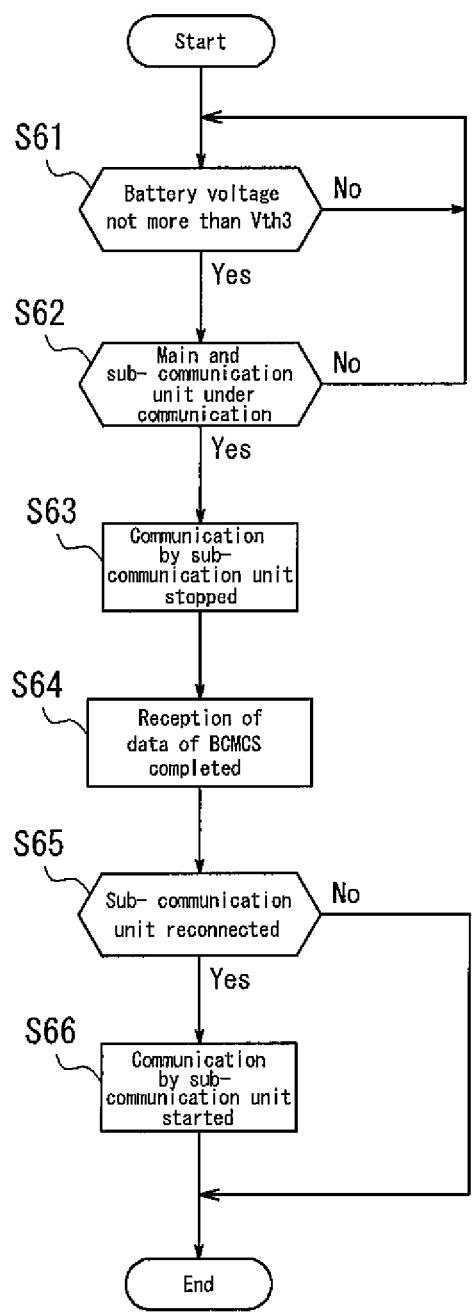
FIG. 10 is a flow diagram showing an example of operation of the portable communication terminal shown in FIG. 1 when the reception of the data of BCMCS by the main communication unit and the wireless LAN communication by the sub-communication unit are carried out simultaneously.

FIG. 10 is a flow diagram showing an example of operation when the reception of the data of BCMCS by the main communication unit and the wireless LAN communication by the sub-communication unit are carried out simultaneously. Here, to begin with, the control unit 111 monitors whether the battery voltage measured in the battery voltage detection unit 104 is not more than Vth3 (a second predetermined value) (step S61). If the communication status is such that the reception of data of BCMCS by the main communication unit and the wireless LAN communication by the sub-communication unit are carried out simultaneously (step S62) at the time when the battery voltage is Vth3 or less than Vth3, it is indicated on the display unit 106 that the communication by the sub-communication unit has to be stopped and the communication by the sub-communication unit is stopped (step S63).

Thereafter, when the reception of data of BCMCS in the main communication unit is completed (step S64), the sub-communication unit is automatically reconnected to resume the communication, or a user can select whether to reconnect the sub-communication unit. FIG. 10 is a flow diagram showing the case in which a user can select whether to reconnect the sub-communication unit. Similarly to the case in FIG. 9, when the reception of data of BCMCS is completed, the control unit 111 indicates a message, on the display unit 106, that encourages a user to select whether to reconnect the sub-communication unit (step S65). When the user selects the reconnection via the operation unit 105, the sub-communication unit is reconnected to start the wireless LAN communication, which is indicated on the display unit 106 accordingly (step S66). If the time required to complete the reception of data of BCMCS is too long for a user to wait, for example, about 30 minutes, the selection process of the reconnection can be skipped.

Thereby, it will not happen that the power supply unit 103 is switched off and the both communications are ended simultaneously in an extraordinary way due to the decrease of the battery voltage, while the reception of data of BCMCS by the main communication unit and the wireless LAN communication by the sub-communication unit are carried out simultaneously, so that the reception of only data of BCMCS can be continued at the time when the battery voltage decreases to Vth3 or less than Vth3. Thus, the same effect as in FIG. 7 and FIG. 8 can be obtained.

As described in the above, according to the embodiments of the present invention, priority is given to the communication by the main communication unit depending on the battery voltage when the sub-communication unit is added, so that it is possible to prevent that the main communication unit and the sub-communication unit end in an extraordinary way due to the decrease of the battery voltage, and as a result, the waiting time of the wireless communication terminal 100 can be extended. In addition, since it is indicated on the display unit 106 that the communication by the sub-communication unit is stopped when it is to be stopped, convenience of a user can be also improved.

The present invention is not limited to the above embodiments, and many variations and modifications are possible. For example, the communication system by the main communication unit is not limited to a system for performing the reception of data of cdma20001x or BCMCS, but can be other types of wireless communication systems, and the sub-communication system is not limited to the wireless LAN, but can be any communication system different from the main communication system. The present invention can be applied not only for the case in which only one sub-communication unit is connectable, but for the case in which a plurality of different sub-communication units is connectable. The external apparatus is not limited to SD, but can be USB and the like.

The invention claimed is:

1. A portable communication terminal comprising:
a first wireless communication unit corresponding to a first wireless communication system;
an interface configured to removably connect an external apparatus;
a determination unit for determining whether the external apparatus connected to the interface includes a second wireless communication unit corresponding to a second wireless communication system;
a battery voltage detection unit for detecting a battery voltage of a power supply unit including a battery; and
a control unit for controlling the external apparatus based on whether a communication by the first wireless communication unit is present, a determination result of the determination unit, and the battery voltage detected in the battery voltage detection unit,
wherein the control unit controls the external apparatus such that it is disabled, if the first wireless communication unit is under communication, and the battery voltage detected in the battery voltage detection unit is not more than a predetermined value when it is determined by the determination unit that the external control apparatus includes the second wireless communication unit.

2. A portable communication terminal comprising:
a first wireless communication unit corresponding to a first wireless communication system;
an interface configured to removably connect a second wireless communication unit corresponding to a second wireless communication system;
a battery voltage detection unit for detecting a battery voltage of a power supply unit including a battery; and
a control unit for controlling the first wireless communication unit and the second wireless communication unit based on the battery voltage detected in the battery voltage detection unit,
wherein the control unit provide a control such that the communication by the second wireless communication unit is stopped and the communication by the first wireless communication unit is continued, if the first wireless communication unit and the second wireless communication unit are under communication when the battery voltage detected in the battery voltage detection unit is not more than a first predetermined value.

3. The portable communication terminal according to claim 2, wherein the control unit provide a control such that a message as to whether to resume the stopped communication by the second wireless communication unit is informed after completion of the communication by the first wireless communication unit.

4. A portable communication terminal comprising:
a first wireless communication unit corresponding to a first wireless communication system:
an interface configured to removably connect a second wireless communication unit corresponding to a second wireless communication system;
a battery voltage detection unit for detecting a battery voltage of a power supply unit including a battery; and
a control unit for controlling the first wireless communication unit and the second wireless communication unit based on the battery voltage detected in the battery voltage detection unit,
wherein the control unit provides a control such that the communication by the second wireless communication unit is stopped and the reception of the data by the first wireless communication unit is continued, if the first wireless communication unit is receiving data of Broadcast/Multicast Service, and the second wireless communication unit is under communication when the battery voltage detected in the battery voltage detection unit is not more than a second predetermined value.

5. The portable communication terminal according to claim 4, wherein the control unit provides a control such that the stopped communication by the second wireless communication unit is resumed after completion of the reception of the data by the first wireless communication unit.

6. A portable communication terminal comprising:
a first wireless communication unit corresponding to a first wireless communication system;
an interface configured to removably connect a second wireless communication unit corresponding to a second wireless communication system,
a battery voltage detection unit for detecting a battery voltage of a power supply unit including a battery; and
a control unit for controlling the first wireless communication unit and the second wireless communication unit based on whether a transmission process by the first wireless communication unit is present, and the battery voltage detected in the battery voltage detection unit,
wherein the control unit provides a control such that the communication by the second wireless communication unit is stopped and the transmission process by the first wireless communication unit is started, if the second wireless communication unit is under communication and the battery voltage detected in the battery voltage detection unit is not more than a predetermined value when the transmission process by the first wireless communication unit is detected.

7. A portable communication terminal comprising:
a first wireless communication unit corresponding to a first wireless communication system;
an interface configured to removably connect a second wireless communication unit corresponding to a second wireless communication system;
a battery voltage detection unit for detecting a battery voltage of a power supply unit including a battery; and
a control unit for controlling the first wireless communication unit and the second wireless communication unit based on whether a call reception information is received by the first wireless communication unit and the battery voltage detected in the battery voltage detection unit, wherein the control unit provides a control such that the communication by the second wireless communication unit is stopped and the reception process by the first wireless communication unit is carried out, if the second wireless communication unit is under communication and the battery voltage detected in the battery voltage detection unit is not more than a predetermined value when the first wireless communication unit receives the call reception information.

8. A portable communication terminal comprising:
a first wireless communication unit corresponding to a first wireless communication system;
an interface configured to removably connect a second wireless communication unit corresponding to a second wireless communication system;
a battery voltage detection unit for detecting a battery voltage of a power supply unit including a battery; and
a control unit for controlling the second wireless communication unit based on a communication status of the first wireless communication unit, whether an order for a transmission process of the communication by the second wireless communication unit is present, and the battery voltage detected in the battery voltage detection unit,
wherein the control unit provide a control such that the transmission process of the communication by the second wireless communication unit is suspended, if the battery voltage detected in the battery voltage detection unit is not more than a predetermined value when an order for a transmission process by the second wireless communication unit is detected while the first wireless communication unit receives data of Broadcast/Multicast service.

9. The portable communication terminal according to claim 8, wherein the control unit provide a control such that the suspended transmission process of the communication by the second wireless communication unit is resumed after completion of the reception of the data by the first wireless communication unit.

10. A portable communication terminal comprising:
a first wireless communication unit corresponding to a first wireless communication system;
an interface configured to removably connect a second wireless communication unit corresponding to a second wireless communication system;
a battery voltage detection unit for detecting a battery voltage of a power supply unit including a battery; and
a control unit for controlling the second wireless communication unit based on a communication status of the first wireless communication unit, whether an order for a transmission process of the communication by the second wireless communication unit is present, and the battery voltage detected in the battery voltage detection unit,
wherein the control unit provide a control such that the transmission process of the communication by the second wireless communication unit is prohibited, if the battery voltage detected in the battery voltage detection unit is not more than a predetermined value when an order for the transmission process by the second wireless communication unit is detected while the first wireless communication unit receives data of Broadcast/Multicast service.

11. The portable communication terminal according to claim 10, wherein the control unit provide a control such that a message as to whether to start the prohibited communication by the second wireless communication unit is informed after completion of the reception of the data by the first wireless communication unit.

12. A portable communication terminal comprising:
a first wireless communication unit corresponding to a first wireless communication system;
an interface configured to removably connect a second wireless communication unit corresponding to a second wireless communication system;
a battery voltage detection unit for detecting a battery voltage of a power supply unit including a battery; and
a control unit for controlling the first wireless communication unit and the second wireless communication unit based on the communication status of the second wireless communication unit and the battery voltage detected in the battery voltage detection unit,
wherein the control unit provides a control such that the communication by the second wireless communication unit is stopped and the reception process of the data by the first wireless communication unit is carried out, if the second wireless communication unit is under communication and the battery voltage detected in the battery voltage detection unit is not more than a predetermined value when the first wireless communication unit starts the reception process of the data of the Broadcast/Multicast service.

13. The portable communication terminal according to claim 12, wherein the control unit provides a control such that the stopped communication by the second wireless communication unit is resumed after completion of the reception of the data by the first wireless communication unit.

14. A control method for a portable communication terminal comprising:
upon controlling the portable communication terminal having a first wireless communication unit corresponding to a first wireless communication system, an interface configured to removably connect an external apparatus, and a power supply unit including a battery,
a determination step for determining whether the external apparatus connected to the interface includes a second wireless communication unit corresponding to a second wireless communication system;
a communication status detection step for detecting a communication status of the first wireless communication unit; and
a battery voltage detection step for detecting the battery voltage of the power supply unit, wherein
the external apparatus is controlled based on a result of the determination in the determination step, a result of the detection in the communication status detection step and the battery voltage detected in the battery voltage detection step, and the external apparatus is controlled such that it is disabled, if it is detected in the communication status detection step that the first wireless communication unit is under communication and the battery voltage detected in the battery voltage detection step is not more than a predetermined value when it is determined in the determination step that the external control apparatus includes the second wireless communication unit.

15. A control method for a portable communication terminal comprising:

upon controlling the portable communication terminal having a first wireless communication unit corresponding to a first wireless communication system, a second wireless communication unit corresponding to a second wireless communication system removably connected via an interface, and a power supply unit including a battery, a communication status detection step for detecting a communication status of the first wireless communication unit and the second wireless communication unit; and a battery voltage detection step for detecting the battery voltage of the power supply unit, wherein the first wireless communication unit and the second wireless communication unit are controlled based on a result of detection in the communication status detection step and the battery voltage detected in the battery voltage detection step, and a control is provided such that the communication by the second wireless communication unit is stopped and the communication by the first wireless communication unit is continued, if it is detected in the communication status detection step that the first wireless communication unit and the second wireless communication unit are under communication when the battery voltage detected in the battery voltage detection step is not more than a first predetermined value.

16. The control method for a portable communication terminal according to claim 15, wherein a control is provided such that a message as to whether to resume the stopped communication by the second wireless communication unit is informed after completion of the communication by the first wireless communication unit.

17. A control method for a portable communication terminal comprising:

upon controlling the portable communication terminal having a first wireless communication unit corresponding to a first wireless communication system, a second wireless communication unit corresponding to a second wireless communication system removably connected via an interface, and a power supply unit including a battery, a communication status detection step for detecting a communication status of the first wireless communication unit and the second wireless communication unit; and a battery voltage detection step for detecting the battery voltage of the power supply unit, wherein the first wireless communication unit and the second wireless communication unit are controlled based on a result of detection in the communication status detection step and the battery voltage detected in the battery voltage detection step, and a control is provided such that the communication by the second wireless communication unit is stopped and the reception of the data by the first wireless communication unit is continued, if it is detected in the communication status detection step that the first wireless communication unit is receiving data of Broadcast/Multicast Service, and the second wireless communication unit is under communication when the battery voltage detected in the battery voltage detection step is not more than a second predetermined value.

18. The control method for a portable communication terminal according to claim 17, wherein a control is provided such that the stopped communication by the second wireless communication unit is resumed after completion of the reception of the data by the first wireless communication unit.

19. A control method for a portable communication terminal comprising:

upon controlling the portable communication terminal having a first wireless communication unit corresponding to a first wireless communication system, a second wireless communication unit corresponding to a second wireless communication system removably connected via an interface, and a power supply unit including a battery, a transmission process detection step for detecting a transmission process by the first wireless communication unit;

a communication status detection step for detecting a communication status of the second wireless communication unit; and a battery voltage detection step for detecting the battery voltage of the power supply unit, wherein the first wireless communication unit and the second wireless communication unit are controlled based on a result of detection in the transmission process detection step, a result of detection in the communication status detection step and the battery voltage detected in the battery voltage detection step, and a control is provided such that the communication by the second wireless communication unit is stopped and the transmission process by the first wireless communication unit is started, if it is detected in the communication status detection step that the second wireless communication unit is under communication and the battery voltage detected in the battery voltage detection unit is not more than a predetermined value when the transmission process by the first wireless communication unit is detected in the transmission process detection step.

20. A control method for a portable communication terminal comprising:

upon controlling the portable communication terminal having a first wireless communication unit corresponding to a first wireless communication system, a second wireless communication unit corresponding to a second wireless communication system removably connected via an interface, and a power supply unit including a battery, a call reception detection step for detecting the reception of a call reception information by the first wireless communication unit;

a communication status detection step for detecting the communication status of the second wireless communication unit; and a battery voltage detection step for detecting a battery voltage of the power supply unit, wherein the first wireless communication unit and the second wireless communication unit are controlled based on a result of detection in the call reception detection step, a result of detection in the communication status detection step and the battery voltage detected in the battery voltage detection step, and a control is provided such that the communication by the second wireless communication unit is stopped and the reception process by the first wireless communication unit is carried out, if it is detected in the communication status detection step that the second wireless communication unit is under communication and the battery voltage detected in the battery voltage detection step is not more than a predetermined value when the reception of the call reception information by the first wireless communication unit is detected.

21. A control method for a portable communication terminal comprising:

upon controlling the portable communication terminal having a first wireless communication unit corresponding to a first wireless communication system, a second wireless communication unit corresponding to a second wireless communication system removably connected via an interface, and a power supply unit including a battery, a communication status detection step for detecting the communication status of the first wireless communication unit;

a transmission process order detecting step for detecting an order for the communication transmission process by the second wireless communication unit; and a battery voltage detection step for detecting the battery voltage of the power supply unit, wherein the second wireless communication unit is controlled based on a result of detection in the communication status detection step, a result of detection in the transmission process order detecting step, and the battery voltage detected in the battery voltage detection step, and a control is provided such that the transmission process of the communication by the second wireless communication unit is suspended, if the battery voltage detected in the battery voltage detection unit is not more than a predetermined value when it is detected in the communication status detection step that the first wireless communication unit is receiving data of Broadcast/Multicast service and the order for the transmission process by the second wireless communication unit is detected in the transmission process order detecting step.

22. The control method for a portable communication terminal according to claim 21, wherein a control is provided such that the suspended transmission process of the communication by the second wireless communication unit is resumed after completion of the reception of the data by the first wireless communication unit.

23. A control method for a portable communication terminal comprising:

upon controlling the portable communication terminal having a first wireless communication unit corresponding to a first wireless communication system, a second wireless communication unit corresponding to a second wireless communication system removably connected via an interface, and a power supply unit including a battery, a communication status detection step for detecting the communication status of the first wireless communication unit;

a transmission process order detecting step for detecting an order for the communication transmission process by the second wireless communication unit; and a battery voltage detection step for detecting the battery voltage of the power supply unit, wherein the second wireless communication unit is controlled based on a result of detection in the communication status detection step, a result of detection in the transmission process order detecting step, and the battery voltage detected in the battery voltage detection step, and a control is provided such that the transmission process of the communication by the second wireless communication unit is prohibited, if the battery voltage detected in the battery voltage detection step is not more than a predetermined value when it is detected in the communication status detection step that the first wireless communication unit is receiving the data of the Broadcast/Multicast service and an order for the transmission process by the second wireless communication unit is detected in the transmission process order detecting step.

24. The control method for a portable communication terminal according to claim 23, wherein a control is provided such that a message as to whether to start the transmission process of the prohibited communication by the second wireless communication unit is informed after the completion of the reception of the data by the first wireless communication unit.

25. A control method for a portable communication terminal comprising:

upon controlling the portable communication terminal having a first wireless communication unit corresponding to a first wireless communication system, a second wireless communication unit corresponding to a second wireless communication system removably connected via an interface, and a power supply unit including a battery, a data reception start detecting step for detecting the start of a data reception process of data of Broadcast/Multicast service by the first wireless communication unit;

a communication status detection step for detecting a communication status of the second wireless communication unit; and a battery voltage detection step for detecting a battery voltage of the power supply unit, wherein the first wireless communication unit and the second wireless communication unit are controlled based on a result of detection in the data reception start detecting step, a result of detection in the communication status detection step and the battery voltage detected in the battery voltage detection step, and a control is provided such that the communication by the second wireless communication unit is stopped and the reception process of the data by the first wireless communication unit is carried out, if it is detected in the communication status detection step that the second wireless communication unit is under communication and the battery voltage detected in the battery voltage detection step is not more than a predetermined value when the start of the reception process of the data by the first wireless communication unit is detected in the data reception start detecting step.

26. The control method for a portable communication terminal according to claim 25, wherein a control is provided such that the stopped communication by the second wireless communication unit is resumed after completion of the reception of the data by the first wireless communication unit.

* * * * *